(12) United States Patent
Paulson

(10) Patent No.: US 11,388,290 B2
(45) Date of Patent: *Jul. 12, 2022

(54) COMMUNICATION LOGGING SYSTEM

(71) Applicant: Karen Paulson, Coleville, CA (US)

(72) Inventor: Karen Paulson, Coleville, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 16/678,595

(22) Filed: Nov. 8, 2019

(65) Prior Publication Data

US 2020/0076951 A1 Mar. 5, 2020

Related U.S. Application Data

(63) Continuation of application No. 15/318,951, filed as application No. PCT/US2015/035878 on Jun. 15, 2015, now Pat. No. 10,498,899.

(60) Provisional application No. 62/012,612, filed on Jun. 16, 2014.

(51) Int. Cl.
*H04M 3/53* (2006.01)
*H04L 9/40* (2022.01)
*H04L 51/04* (2022.01)
*H04L 51/23* (2022.01)
*H04L 51/234* (2022.01)
*H04L 51/42* (2022.01)
*H04M 3/22* (2006.01)
(Continued)

(52) U.S. Cl.
CPC .......... *H04M 3/5307* (2013.01); *H04L 51/04* (2013.01); *H04L 51/22* (2013.01); *H04L 51/30* (2013.01); *H04L 51/34* (2013.01); *H04L 63/06* (2013.01); *H04L 63/083* (2013.01); *H04L 63/10* (2013.01); *H04L 63/1425* (2013.01); *H04L 63/308* (2013.01); *H04M 3/2218* (2013.01); *H04M 3/2281* (2013.01); *H04M 3/53333* (2013.01); *G06Q 10/1091* (2013.01); *H04M 2203/301* (2013.01); *H04M 2203/4518* (2013.01)

(58) Field of Classification Search
None
See application file for complete search history.

(56) References Cited

U.S. PATENT DOCUMENTS 5,349,636 A  9/1994  Irribarren
5,657,376 A  8/1997  Espeut et al.
5,666,397 A  9/1997  Lamons et al.
(Continued)

OTHER PUBLICATIONS

Kaufman; How to Add a Note to an Email Message in Outlook 2013; 2013; Retrieved from the Internet https://www.howtogeek.com/173329/how-to-add-a-note-to-an-email-message-in-outlook-2013/>; pp. 1-11, as printed. (Year: 2013).*

(Continued)

*Primary Examiner* — Michael W Chao
(74) *Attorney, Agent, or Firm* — Vista IP Law Group LLP

(57) ABSTRACT

A communication logging system facilitates communications between two or more users. A secured database stores communications from each user, and the system notifies the intended recipients of the communications. The system records times of creation of the communications, times of access to the communications, and who created and/or accessed the communications. The communications may not be altered or deleted once recorded, so there is a permanent source of reliable evidence as to the content of the communications and information associated therewith.

19 Claims, 3 Drawing Sheets

(51) Int. Cl.
*H04M 3/533* (2006.01)
*G06Q 10/10* (2012.01)

(56) References Cited

U.S. PATENT DOCUMENTS

| | | | | |
|---|---|---|---|---|
| 5,926,524 | A * | 7/1999 | Taylor | H04L 29/06 |
| | | | | 379/201.01 |
| 6,088,428 | A * | 7/2000 | Trandal | H04M 3/382 |
| | | | | 379/189 |
| 6,522,727 | B1 | 2/2003 | Jones | |
| 6,535,892 | B1 | 3/2003 | LaRue | |
| 6,690,785 | B1 | 2/2004 | Stelter et al. | |
| 6,751,299 | B1 | 6/2004 | Brown et al. | |
| 6,865,260 | B1 | 3/2005 | Meadows et al. | |
| 6,865,268 | B1 | 3/2005 | Matthews et al. | |
| 6,904,521 | B1 | 6/2005 | Jivsov | |
| 6,928,149 | B1 * | 8/2005 | Panjwani | H04M 3/53333 |
| | | | | 379/88.12 |
| 7,724,880 | B2 * | 5/2010 | Forney | H04L 51/066 |
| | | | | 379/88.13 |
| 7,885,275 | B2 | 2/2011 | Frifeld | |
| 8,218,736 | B1 * | 7/2012 | McClintock | H04M 1/658 |
| | | | | 379/88.22 |
| 8,433,043 | B2 | 4/2013 | Finnigan | |
| 8,903,064 | B2 * | 12/2014 | Okita | H04M 3/2218 |
| | | | | 379/121.04 |
| 9,054,909 | B2 * | 6/2015 | Shtiegman | H04M 3/54 |
| 9,559,995 | B1 | 1/2017 | Wong | |
| 10,110,548 | B2 | 10/2018 | Clarke | |
| 11,140,262 | B2 * | 10/2021 | Rokosky | H04L 67/02 |
| 11,165,742 | B1 * | 11/2021 | Tovino | H04L 67/02 |
| 2002/0067810 | A1 | 6/2002 | Barak et al. | |
| 2002/0191759 | A1 | 12/2002 | Rossouw | |
| 2003/0086549 | A1 | 5/2003 | Boehmke | |
| 2004/0071273 | A1 * | 4/2004 | Booton | H04M 3/465 |
| | | | | 379/88.17 |
| 2004/0153456 | A1 | 8/2004 | Charnock | |
| 2004/0172455 | A1 * | 9/2004 | Green | H04L 51/24 |
| | | | | 709/207 |
| 2005/0069096 | A1 | 3/2005 | Claudatos et al. | |
| 2006/0171511 | A1 * | 8/2006 | Liu | H04M 3/42221 |
| | | | | 379/67.1 |
| 2007/0233519 | A1 * | 10/2007 | Lorsch | G16H 40/67 |
| | | | | 705/3 |
| 2008/0167008 | A1 * | 7/2008 | Novick | H04M 3/53333 |
| | | | | 455/413 |
| 2008/0177661 | A1 * | 7/2008 | Mehra | G06Q 20/305 |
| | | | | 705/44 |
| 2010/0036926 | A1 * | 2/2010 | Ahart | H04L 51/36 |
| | | | | 709/206 |
| 2010/0161743 | A1 * | 6/2010 | Krishnamurthi | G16H 40/20 |
| | | | | 709/206 |
| 2010/0250682 | A1 | 9/2010 | Goldberg | |
| 2011/0075828 | A1 * | 3/2011 | Okita | H04M 3/42263 |
| | | | | 379/201.02 |
| 2011/0126126 | A1 | 5/2011 | Blair | |
| 2011/0138175 | A1 | 6/2011 | Clark | |
| 2011/0286584 | A1 * | 11/2011 | Angel | G10L 15/26 |
| | | | | 379/88.02 |
| 2012/0053938 | A1 * | 3/2012 | Trivi | G10L 15/26 |
| | | | | 704/235 |
| 2012/0172008 | A1 * | 7/2012 | Gupta | H04M 11/10 |
| | | | | 455/413 |
| 2012/0196629 | A1 | 8/2012 | Movsesyan | |
| 2012/0203853 | A1 | 8/2012 | Davis et al. | |
| 2014/0006611 | A1 | 1/2014 | Perez | |
| 2014/0067974 | A1 * | 3/2014 | Lewinson | H04L 51/34 |
| | | | | 709/206 |
| 2014/0082102 | A1 | 3/2014 | Baxter, Jr. | |
| 2014/0143028 | A1 * | 5/2014 | Howe | G06Q 50/01 |
| | | | | 705/12 |
| 2014/0195626 | A1 * | 7/2014 | Ruff | H04W 12/088 |
| | | | | 709/206 |
| 2014/0287727 | A1 * | 9/2014 | Hellebust | H04M 1/7243 |
| | | | | 455/412.2 |
| 2016/0044163 | A1 * | 2/2016 | Jiang | H04M 3/42042 |
| | | | | 379/142.06 |
| 2016/0234025 | A1 * | 8/2016 | Tomkow | H04L 63/123 |
| 2017/0054665 | A1 * | 2/2017 | Hertz | G06Q 10/10 |
| 2018/0352071 | A1 | 12/2018 | Karunamuni et al. | |

OTHER PUBLICATIONS

PCT International Search Report for PCT/US2015/035878, Applicant: Ponce, Karen, Form PCT/ISA/210 and 220, dated Sep. 21, 2015 (3pages).
PCT Written Opinion of the International Search Authority for PCT/US2015/035878, Applicant: Ponce, Karen, Form PCT/ISA/237, dated Sep. 21, 2015 (7pages).
PCT International Preliminary Report on Patentability (Chapter I of the Patent Cooperation Treaty) for PCT/US2015/035878, Applicant: Karen Paulson, Form PCT/IB/326 and 373, dated Dec. 29, 2016 (9pages).
https://www.talkingparents.com/home, date: unknown.
https://www.talkingparents.com/how-it-works, date: unknown.
http://coparently.com/co-parent-communication, date: unknown.
https://www.ourfamilywizard.com/practitioners/courts, date: uknown.
No stated author; Exchange Server 2013 Text Messaging; Mar. 2014; Retrieved from the Internet <U RL: https://social.technet.microsoft.com/wiki/contents/articles/23226.exchange-server-2013-text-messaging.aspx>; pp. 1-3, as printed. (Year: 2014).
Lambert et al.; Microsoft Outlook 2013: Step by Step; 2013; ISBN 978-0-7356-7560-5; Retrievable from the Internet <URL: https://www.microsoftpressstore.com/store/microsoft-outlook-2013-step-by-step-9780735669093>; pp. 1-186, as printed. (Year: 2013).
No stated author; Review the voice mail calls for a user; 2013; Retrieved from the Internet <URL: https://technet.microsoft.com/en-us/library/jj659070(v=exchg.150).asp>; pp. 1-2, as printed. (Year: 2013).
Subramanian; Exchange Server 2013 Operation Guide; Mar. 2014; Retrieved from the Internet <URL:https://gallery.technet.microsoft.com/Exchange-Server-2013-e35c46ed>; pp. 1-30, as printed. (Year: 2014).
Schauland; Manage Exchange 2010 remotely with PowerShell; 2012; Retrieved from the Internet <URL:https://www.techrepublic.com/blog/data-center/manage-exchange-2010-remotely-with-powershell/>; pp. 1-4, as printed. (Year 2012).
Morimoto et al.; Microsoft Exchange Server 2013 Unleashed; 2013; Pearson Education Inc.; pp. 1-47, as printed. (Year: 2013).
No stated author; PointBridge, Forwarding a Voicemail via Outlook; 2008; Retrieved from the Internet <URL:https://blogs.perficient.com/2008/10/17/forwarding-a-voicemail-via-outlook/>; pp. 1-7 as printed. (Year: 2008).
No stated author; Message tracking: Exchange 2013 help; 2016; Retrieved from the Internet <URL:https://docs.microsoft.com/en-us/exchange/rnessage-tracking-exchange-2013-help>; pp. 1-13 as printed. (Year: 2016).
Greenlee; "Calling an Exchange UM voicemail box directly"; 2012; Retrieved from the Internet <URL:blog.greenlee/2012/01/22/calling-exchange-um-voicemail-box/>; pp. 1-4, as printed. (Year: 2012).
Chin et al.; "(Optional) Verify PIN policy settings in Lync Server 2013"; 2012; Retrieved from the Internet <URL: https://docs.microsoft.com/en-us/lyncserver/lync-server-2013-optional-verify-pin-policy-settings>; p. 1 (Year: 2012).
Chin2 et al.; "Features of integrated Unified Messaging and Lync Server 2013"; 2012; Retrieved from the Internet <URL: https://docs.microsoft.corn/en-us/lyncserver/lync-server-2013-features-of-integrated-unified-rnessaging>; pp. 1-2, as printed. (Year: 2012).

* cited by examiner

COMMUNICATION LOGGING SYSTEM

CROSS-REFERENCE TO RELATED APPLICATIONS

This Application is a continuation of U.S. application Ser. No. 15/318,951, which is allowed, and which is a U.S. National Stage filing under 35 U.S.C. § 371 of International Application Serial No. PCT/US2015/035878, filed Jun. 15, 2015, which claims the benefit of U.S. provisional Application Serial No. 62/012,612, filed on Jun. 16, 2014. Priority to the aforementioned applications is claimed pursuant to 35 U.S.C. § 119, 35 U.S.C. § 120, and any other applicable statutes. The contents of the aforementioned applications are hereby incorporated herein by reference in their entireties as if set forth fully herein.

BACKGROUND OF THE INVENTION

Field of the Invention

This invention relates to a system that logs voice ails and other communications (also referred to herein as messages) between users in a secure and unbiased manner.

Background

Many voicemail systems and related systems are described in U.S. patents and/or U.S. patent publications, such as: Meadows, et al., U.S. Pat. No. 6,865,260; Barak; et al. U.S. 2002/0067810; Panjwani, et al., U.S. Pat. No. 6,928,149; Stelter, et al., U.S. Pat. No. 6,690,785; Claudatos, et al., 2005/0069096; Jones, U.S. Pat. No. 6,522,727; Espeut, et al., U.S. Pat. No. 5,657,376; Lamons, et al., U.S. Pat. No. 5,666,397; Brown, et al., U.S. Pat. No. 6,751,299; and Rossouw, U.S. 2002/0191759. The above-described references are hereby incorporated herein by reference in their entireties.

The prior art teaches various phone message systems. However, the prior art does not teach a system that is secure, unbiased, managed by a neutral third party (i.e., a party other than a party to the communications), and which stores not only the message, but also the time that the message was left, the duration of the message, the number of messages, if and when the message was retrieved, and other data associated with the message. The prior art also does not teach a communication logging system that prevents users from modifying or deleting the contents and associated characteristics of the communications, and that is maintained in a secure environment (e.g., a database) so the communications may later be referenced and relied upon by the courts, law enforcement, and the like. The present invention fulfills these needs and provides further elated advantages as described in the following summary and detailed description.

SUMMARY OF THE INVENTION

The present invention teaches certain benefits in construction and use which give rise to the objectives described herein. As used herein, to "log" a communication means not only to capture the communication in a tangible form, but also to create a record of data associated with the communication, as described more fully herein. Also as used herein to "enter" a message means to cause a message to be logged by the system, such as by leaving a voicemail, sending an email or txt, etc.

In one aspect, the present invention provides for a system that makes a record of voicemails and other communications, and logs their characteristics for the purpose of documenting communications between a first user and a second user. It is referred to as a "communication logging" system, as any type of communication may be logged and managed. The system may also be used to manage communications between more than two users, and may manage multiple groups of users wherein each group includes two or more parties. Such a system, for example, could be used by many groups of mothers, fathers, and children and others involved in custody disputes. In this case, each group would have access as applicable to their own communications within the group, but would not have access to (and indeed would likely not be aware of) communications within other groups. But the system would manage them all. For simplicity, the invention is described primarily with respect to only two users of a single group, but the principles apply to additional users and groups.

The communication logging system has a message recording module for recording communications (e.g., audio, visual, audio-visual, email, text, etc.) from a first user to a second user, and from the second user to the first user. An event database stores information associated with each communication, such as the time it was recorded, the time(s) it was accessed, by whom it was accessed each time, and its length (in units of time). The system also has a message alert notification module. The notification module alerts the intended recipient when a new communication has been left for the intended recipient. Typically, the communication will be in the intended recipient's "in-box," which may be a single virtual in-box or a series of virtual in-boxes managed by the system, separated, e.g., by communication type. Communication type may be based on the message format (e.g., email, text, voicemail, etc.), the sender, the dates, the projects, cases, or matters, or any other logical classification factor or combination thereof. The alert may be via phone, email, text and/or other methods and/or devices.

The communication logging system is especially well-adapted to facilitate and document communications between parties that are in high conflict, such as in divorce cases. The system facilitates the exchange of information without the need for any in-person communication between the parties. It provides for an unbiased and unalterable record of the parties' communications maintained and managed by a neutral third party.

The parties may agree (or be ordered) not to communicate with each other in real time, and instead communicate primarily (e.g., for specific subjects) or even exclusively by using the communication logging system. This agreement, understanding, or restraint may be pursuant to a court order.

The system should be monitored and managed by a neutral third party, such as a court-appointed Communication Logging system provider or a hired person or company. A court or other governing entity may also have controlled access to the system, for reviewing communications, accessing reports, etc. Inherently and as such, the system may promote more civil communications.

The situation of a couple going through (or having gone through) a divorce is used herein as an example, but the system may be used for any other suitable application, such as communications between different or disparate business enterprises, parents and children, businesses or professionals and clients, or any situation which could benefit from the facilitation aspect and/or the data/evidence retention aspect of the invention.

In one embodiment, the system includes: a user database configured to store a password of a first user and a password of a second user; a message recording module configured to record a communication from the first user to the second user; a message checking module configured to enable the second user to access the communication; a time-stamp module configured to generate a first time stamp comprising a time the communication was recorded by the first user and a duration of the communication, and a second time stamp comprising a time the communication was accessed by the second user; a user control module configured to enable the first user to change a first status of the communication and configured to maintain the first status from a perspective of the first user until subsequently changed by the first user, and configured to enable the second user to change a second status of the communication and configured to maintain the second status from a perspective of the second user until subsequently changed by the second user; an event database configured to store the communication, the first time stamp, the second time stamp, and status information associated with the communication; and a master control module configured to prevent modification of the event database except following entry of an administrator password that is different than the password of the first user and different than the password of the second user; and configured to produce a report of selected contents of the event database including the communication, the first time stamp, and the second time stamp.

In another embodiment a method of the present invention includes: receiving a log-in request from a first user to confirm the identity of the first user and allow the first user to log in to a system; confirming the identity of the first user based on a first password entered by the first user, and allowing the first user to log in to the system based upon the confirmation; recording a communication from the first user in an event database; recording a first time stamp in the event database comprising a time the communication was recorded and a duration of the communication; receiving a log-in request from a second user to confirm the identity of the second user and allow the second user to log in to the system; confirming the identity of the second user based on a second password entered by the second user, and allowing the second user to log in to the system based upon the confirmation; delivering the communication to the second user; recording a second time stamp in the event database comprising a time the communication was delivered to the second user; and restricting access to the database through a security module such that the first user is unable to modify the event database when logged in using the first password, and the second user is unable to modify the event database when logged in using the second password.

An objective of the present invention is to provide a communication logging system having advantages not taught by the prior art.

Another objective is to provide a communication logging system that stores the communications between a first user and a second user, and stores the characteristics related to the communications, so that the information can later be reported on and used with reliability and credibility, such as in a court of law.

Another objective is to provide a communication logging system that prevents users from deleting, erasing, or otherwise altering the communications.

Another objective is to provide a communication logging system that documents characteristics associated with the communication, such as the time that the communication was first recorded, the duration, by whom, when and by whom it was accessed, and when and what type of notification was sent by the system to alert the other party or parties that a communication has occurred.

Another objective is to provide a communication logging system that enables only secured access, e.g., via password, biometrics, or other identity verification (any of which may be deemed a "password" as used herein).

Another objective is to provide a communication logging system that automatically sends out notifications to the intended recipients so the intended recipients know when a new communication has been left in respective their in-boxes.

Another objective is to provide a communication logging system that is managed and maintained by a neutral and independent third party and protected from having any of the communications or associated characteristics modified or deleted by the users or any other party, so the documented communications are credible evidence when presented to courts, law enforcement, etc.

Another objective is to provide a communication logging system that is backed up electronically. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate preferred embodiments of the present invention. In such drawings.

DETAILED DESCRIPTION OF THE INVENTION

The communication logging system 10 of the present invention facilitates communications between users, which may be audio, visual, audio-visual, or written (e.g., email, text, instant-messaging, or other manner), by not only recording the communication, but also logging data associated with the communication, such as when the communication was entered into the system, by whom, its duration, who accessed it and when, etc. Notifications of new messages are sent to the intended recipient, typically by the method(s) chosen by the recipient as specified in a unique user profile. Such methods may include phone call, voicemail, email, fax, text, posting on a secured server (e.g., accessible through the Internet and/or a mobile application). The communication logging system saves all of the information (communications and associated data) in storage media such as an event database 46. The event database 46 is secured using well-known methods such as encryption, password access, and/or firewalls, etc.

The communication logging system 10 is especially well-adapted to facilitating and documenting communications between parties in conflict, such as in divorce cases. In such cases, parties may be more likely to communicate in a civil manner knowing there is an accurate and reliable record of their communications, such as the content, frequency, and duration of their time-stamped communications, and of their retrieval of communications from others. In addition, the parties may feel more confident knowing the communications are documented.

The invention allows for production of reliable evidence of communications between the parties, which is extremely useful, especially in instances where there are "he said/she said" allegations between the parties. The court or governing authority will have reliable evidence of the facts relating to the parties' communications, and thus can make more informed decisions. The communication logging system could also be used in business applications. Businesses and their clients could benefit from the protection of a neutral third party maintaining copies of their communications, such as in stock trading and other communications pertaining to sales transactions.

Figure 1:
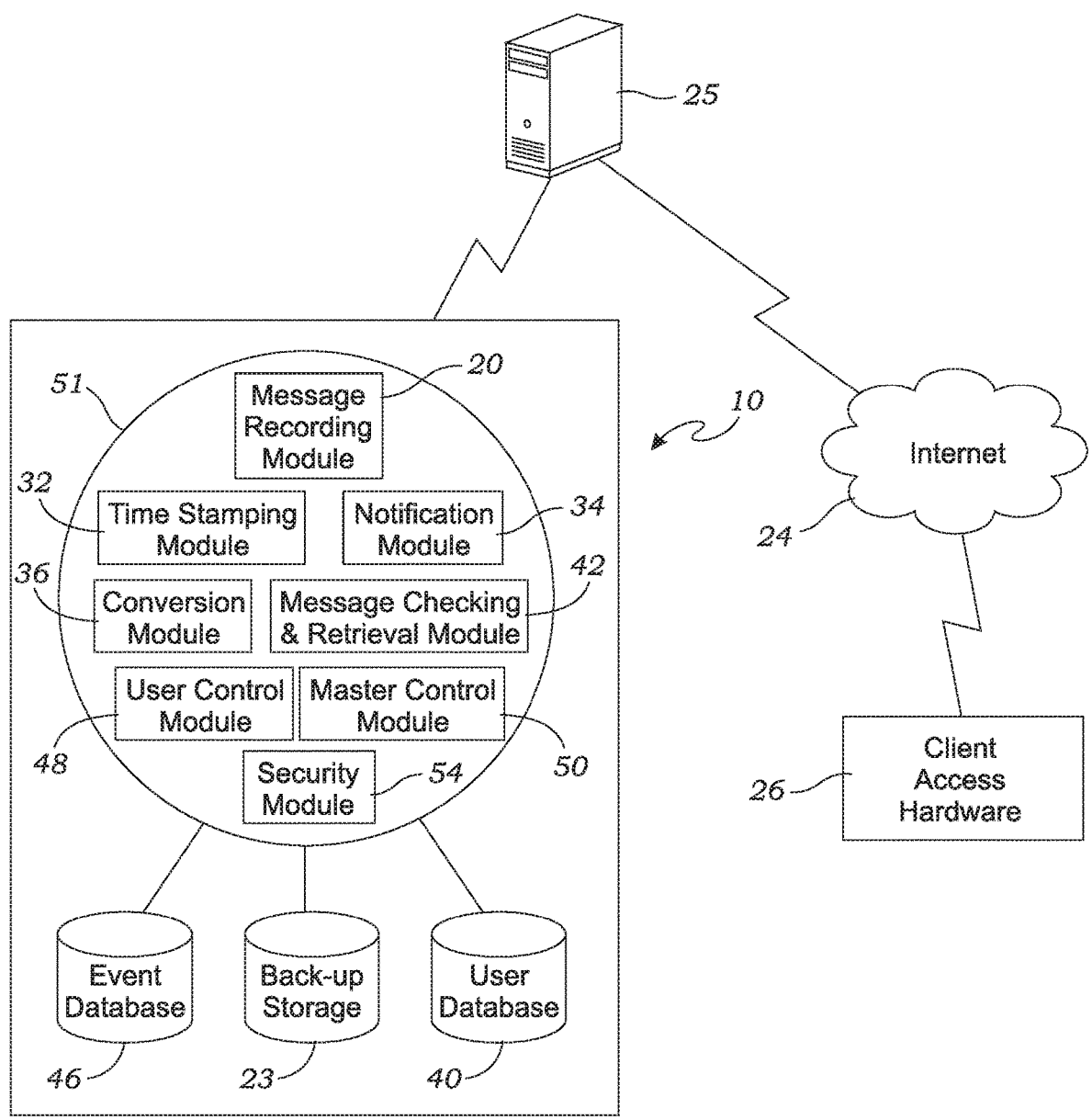
FIG. 1 is a block diagram of one embodiment of the present invention.

Turning to FIG. 1, a block diagram of one embodiment of the communication logging system 10 of the present invention is shown. The communication logging system 10 preferably runs on a server or other centralized computer 25, and includes a message recording module 20, and data storage such as a user database 40, the event database 46, and backup storage 23. The storage may be physically or virtually separated, and may be operatively connected to the server 25 and/or message recording module 20 either locally (as shown) or by way of a network 24 such as the Internet. Users may access the system 10 either locally, or (as shown) through network 24 via client hardware 26 such as phones, PCs, mobile devices, etc.

The network 24 may support various communications, such as phone, VoIP, text messaging, instant messaging, email, video, or any other form of communication, or a combination of the aforementioned. In a preferred embodiment, the message recording module 20 supports a variety of these communication protocols, so that users may communicate in a variety of ways for their mutual convenience. Such data storage devices 40, 46, 23, servers 25, and networks 24 are well-known in the art, and so the specific design and selection of such devices and systems may be determined as needed by any person skilled in the art who desires to implement the present invention.

The message recording module 20 should require a password and/or other form(s) of security identification, such as a token-generated code, a biometric, etc., from the users, as described in greater detail herein. Security identification is required to document who the user is and that a communication or other action s performed by that user.

The communication logging system 10 further includes a clock as is known in the art, used to document a date, time, and duration of events described herein. The clock may be in any form known in the art, but is preferably a digital clock controlled by the central computer 25.

As also shown in FIG. 1, the communication logging system 10 includes a time-stamping module 32 that indicates the time, according to the clock, that an event occurred. The event may be access to a message, retrieval of a message, leaving a message, an attempt at any of the aforementioned, etc.

In a preferred embodiment, the communication logging system 10 includes a notification module 34 for notifying one user that another user has recorded a communication, retrieved a communication, etc. For example, the notification module 34 may notify a user by text, telephonic message, email, etc. sent to the user's mobile device (such as a smart phone) or other device (such as a personal computer, tablet, etc.). The notification module 34 may also use the telephonic or VoIP system 26 to notify the user or to leave a message on a standard voicemail account, optionally including a copy of the communication. Furthermore, the notification module 34 may also generate an email transmission of either an alert for the user to check for the communication, and/or a copy of the communication. The email could optionally include a file that contains the actual message, or a text copy of the communication. Those skilled in the art can develop various alternative methods that are not described in detail herein, and these alternative embodiments should be considered within the scope of the claimed invention.

The communication logging system 10 further includes a user database 40 for storing identity verification information, user profiles, etc. This information may be entered and updated according to methods known in the art. The user database 40 manages identity verification information to restrict access of users to only contents of the communication logging system 10 to which they are authorized to access. The user database 40 and the event database 46 are preferably separate components of a single relational database; however, they may be separate physical databases as shown in FIG. 1 and/or may be controlled by separate applications.

The communication logging system 10 further includes a message checking and retrieval module 42 for enabling a user to access and retrieve (e.g.; download, listen to, copy, view, etc.) a communication. The message checking module 42 may interface with phones, computers, or any other communication system or device. Even if the communication is initially given in a telephonic or audible form, the message may be converted into another format (e.g., text, email, fax, audible, etc.) by a conversion module 36 using tools and methods well-known in the art.

The communication logging system 10 further includes an event database 46 for storing the communications, the recording and access time stamps, statuses of the communications, and other data associated with the communications. The event database 46 associates these elements with the corresponding users in the user database 40, so proper access may be controlled. Administration of the system 10 may be implemented through software, but the actual administrator responsible for the system should be a neutral third party. Typically, the administrator is agreed to by the users, or is court-appointed. All of the modules described herein may be implemented via software 51 using various algorithms known to those skilled in the art, and all of the modules may be part of an integrated software system, or may be separate modular components. In either case, the modules are all interrelated in that they cooperate to accomplish the tasks described herein.

In a preferred embodiment, a user control module 48 enables the users to control the status of communications from their own perspective, to represent how they would like the communication to be labeled. For example, after accessing a communication, one user may prefer to label it as "delete", "save", "important" or some other user-defined status/classification. This concept of using statuses to classify messages is similar to folders used with MICROSOFT'S OUTLOOK program to classify emails. Thus, a particular message may have a different status for the first user when the first user accesses the system, as compared to for the second user when the second user accesses the system, depending on how they each classified the message. Note, however, that these classifications/folders are to assist the users in organizing the communications in a desirable manner, but the content of the communications and the associated characteristics of the communication cannot be changed or deleted by any of the users, even, e.g., for a message classified as "deleted", Classifying a message as deleted is simply analogous to placing the communication in a folder titled "deleted" for organizational purposes. Thus, the communications and all associated characteristics remain in the database(s) for future access. Each communication is initially classified as "new," or something similar, but its classification may change over time from each user's perspective, based on each user's desired classification. When the communication is classified as new, the message alert notification system 34 alerts the user to whom the communication is addressed that the communication is waiting to be reviewed.

A master control module 50 of the communication logging system 10 includes an administrator identity verification that allows the administrator secured access to all features of the system 10, and restricts other users to authorized features only, e.g., processing of communications the users have either entered or which were entered for them. For example, an administrator may be able to print comprehensive reports on all communications, whereas a particular user may be able to print reports involving only communications to which that user is a party. This security aspect of the master control module 50 is important to preserve the integrity of communications and data associated therewith, for use in court proceedings and the like. If there is documentation that an important message was/was not sent and/or received, a court would be more clearly able to make decisions about critical issues, such as terms of child custody and/or visitation, etc. If one parent is not properly caring for the child, picking the child up or taking the child to various events (such as from school, or a sports practice, etc.), or otherwise failing in his or her responsibilities, the court can review documentation of the facts, without obfuscation about whether that parent knew of the event, received a certain message, etc.

Figure 2:
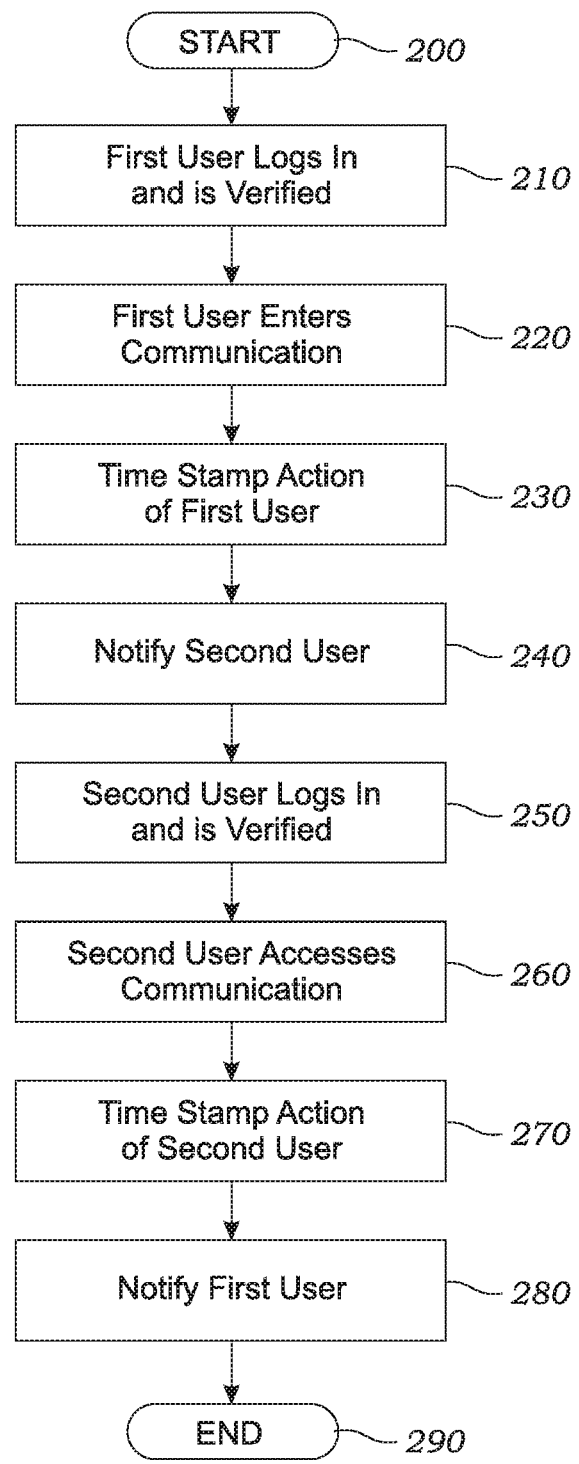
FIG. 2 is a flow diagram showing a method of receiving and delivering a communication in accordance with an embodiment of the present invention.

Turning to FIG. 2, a flow diagram showing a method of receiving and delivering a communication in accordance with an embodiment of the present invention is shown. The method begins at Step 200. At Step 210, a first user requests to log in to the system, is securely identified, and allowed to log in. The first user then accesses the message recording module 20 of the system 10.

Access may be by phone, text, email, or other means. At Step 220, the first user then enters a communication, such as by recorded message, text message, email, or any other suitable means, and the communication is stored in the event database 46. The communication is associated as having been entered by the first user based on identity verification, and is associated as having been entered for the second user as the intended recipient based on information provided by the first user while entering the communication, e.g., via prompts. At Step 230 the action of the first user (in this example, entering the message) is time-stamped by the time-stamping module 32. The time-stamp may include various information, such as time the message was left (start and end), and duration. The time stamp information is stored in the event database 46 along with the message.

The intended recipient(s) is/are then notified at Step 240 by the message alert and notification module 34 that a message is waiting to be retrieved. The notification may be via a mobile phone, text message, email, voicemail, instant message, or other suitable form of notification. The notification or alert should be immediate, such as to a mobile phone, but it may be time-delayed. The notification also may not be automatic, but instead be triggered only upon a query from the intended recipient or recipients as the case may be, such as by the intended recipient(s) logging in to a website, or calling in to a voice response unit/voicemail system. In such a case, Step 240 would not occur directly after Step 230, but instead would occur only after Step 250 during which the second user requests such notifications.

At Step 250, the second user (who, in this example, is the intended recipient of the communication from the first user) requests to log in to the system, is securely identified, and allowed to log in. The second user then accesses the message checking and retrieval module 42 of the system 10 at Step 260, and accesses the message. The message checking and retrieval module then delivers the message to the second user in a preset manner or a manner designated by the second user either during this Step, or as previously elected by the second user, e.g., during profile set up. At Step 270 the action of the second user (in this example, accessing the message) is time-stamped by the time-stamping module 32. At Step 280, the system then optionally notifies the first user that the message was accessed. Such notifications may be automatic, or as opt-in based on the first user's profile settings. The method then ends at Step 280. FIG. 2 illustrates a simple example of a single communication from a first user being recorded for a second user, and then being retrieved by the second user. Of course, a VRU menu or other interface (e.g., from a smart phone or web-based application) may be programmed as needed to present various options to any user logging in to the system. This is reflected in the method illustrated in FIG. 3.

Figure 3:
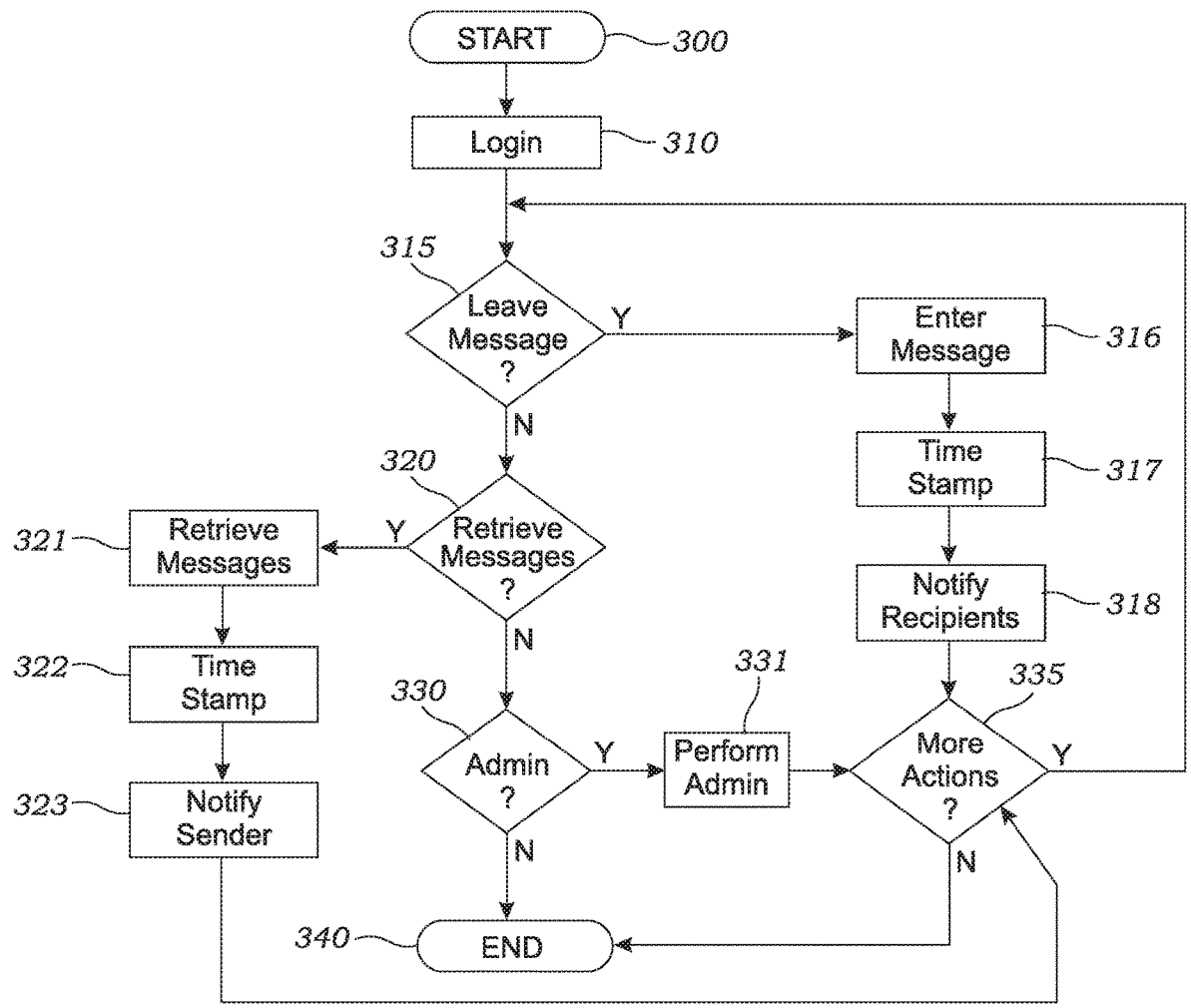
FIG. 3 is also a flow diagram showing a method of receiving and delivering a communication in accordance with an embodiment of the present invention.

Turning to FIG. 3, the method begins at Step 300. At Step 310, a user logs in as described herein. At Step 315 the system then queries if the user wants to record a message. If YES, then the user enters the message at Step 316 (similar to Step 220 of FIG. 2), the message is time-stamped at Step 317 (similar to Step 230 of FIG. 2), and the intended recipients are notified at Step 318 (similar to Step 240 of FIG. 2). The user is then queried at Step 335 to determine if the user wants to perform any further actions. If NO, then the method ends at Step 340. If YES, the method returns to Step 315.

If the user responds NO to the query at Step 315, the method proceeds to Step 320 where the user is asked if he or she wants to retrieve messages. If YES, then the user retrieves the message(s) at Step 321 (similar to Step 260 of FIG. 2), the actions are time-stamped at Step 322 (similar to Step 270 of FIG. 2), and the sender is notified at Step 323 (similar to Step 280 of FIG. 2). The user is then queried at Step 335 to determine if the user wants to perform any further actions. If NO, then the method ends at Step 340. If YES, the method returns to Step 315.

If the user responds NO to the query at Step 320, the method proceeds to Step 330 where the user is asked if he or she wants to perform administrative functions, which may include authorized reporting, updating profile information, leaving a message for the administrator, etc. If YES, the method proceeds to Step 331 where the user performs such administrative functions, and then to Step 335 to either loop back to Step 315 for more actions, or end at Step 340. The options at Steps 315, 320, and 330, of course may be presented in any order sequentially, or as various options from a single menu.

Access to the event database 46 is restricted through a security module 54 such that the first user is unable to modify the event database when logged in using the first password, and the second user is unable to modify the event database when logged in using the second password. In other words, users logged in as such are not able to modify the contents of the event database. Rather, the contents are permanent, and can be modified (if at all), only by an administrator logged in using an administrator password. The administrator is authorized to print reports on all of the activity within the system, including contents of the messages (e.g., actual audio recordings or printouts), and all data associated with the messages.

Any or all of the activity described herein may be conducted via a mobile or smart phone application, or from a PC or tablet, or using any other suitable protocol.

While the invention has been described with reference to at least one preferred embodiment, it should be understood by those skilled in the art that the invention is not limited thereto. Rather, the scope of the invention is to be limited only be the scope of the claims that follow.

What is claimed is:

1. A method for logging a voicemail communication from a first user to a second user, comprising:
    receiving a phone call from a first user;
    confirming an identity of the first user based on a security identification provided by the first user;
    allowing the first user to access a system based upon the confirmation of the identity of the first user;
    recording in an event database, a voicemail communication from the first user communicated via the phone call;
    recording a first time stamp record in the event database comprising a time the voicemail communication was recorded and a length of the voicemail communication;
    notifying a second user of the voicemail communication;
    confirming an identity of the second user based on a security identification provided by the second user;
    allowing the second user to access the system based upon the confirmation of the identity of the second user;
    delivering the voicemail communication to the second user;
    recording a second time stamp in the event database comprising a time the voicemail communication was delivered to the second user;
    restricting access to the event database such that none of the voicemail communication, the first time stamp record, and the second time stamp record can be modified or deleted, thereby providing an unalterable record of the voicemail communication, the first time stamp record, and the second time stamp record;
    assigning an initial first status of the voicemail communication for the first user and an initial second status of the voicemail communication for the second user, a "status" of a voicemail communication being a label associated with the voicemail communication for a particular user, and allowing modification of the first status by only the first user, and allowing modification of the second status by only the second user;
    receiving a request from the first user to change the first status of the voicemail communication;
    changing the first status of the voicemail communication in response to the request from the first user to change the first status of the voicemail communication, wherein changing the first status does not alter any of the voicemail communication, the first time stamp record or the second time stamp record;
    confirming an identity of an administrator based on a security identification provided by the administrator, the administrator being a third-party agreed upon by the first user and the second user;
    allowing the administrator to access the system based upon the confirmation of the identity of the administrator;
    receiving a request from the administrator for a report comprising the voicemail communication, the first time stamp, and the second time stamp; and
    providing the report to the administrator.

2. The method of claim 1, further comprising receiving a request from the second user to change the second status of the voicemail communication, and changing the second status of the voicemail communication in response to the request from the second user.

3. The method of claim 1, wherein the security identification provided by the administrator comprises a biometric.

4. The method of claim 1, wherein the security identification provided by the second user comprises a biometric.

5. The method of claim 1, wherein the security identification provided by the first user comprises a biometric.

6. The method of claim 5, wherein the security identification provided by the second user comprises a biometric.

7. The method of claim 6, wherein the security identification provided by the administrator comprises a biometric.

8. The method of claim 1, further comprising receiving a request from the second user to change the second status of the voicemail communication, and changing the second status of the voicemail communication in response to the request from the second user.

9. The method of claim 1, wherein the security identification provided by the first user comprises a biometric.

10. The method of claim 1, wherein the security identification provided by the second user comprises a biometric.

11. The method of claim 10, wherein the security identification provided by the first user comprises a biometric.

12. The method of claim 1, further comprising notifying the first user that the voicemail communication was delivered to the second user.

13. A method for logging a voicemail communication from a first user to a second user, comprising:
    receiving a phone call from a first user;
    confirming an identity of the first user based on a security identification provided by the first user;
    allowing the first user to access a system based upon the confirmation of the identity of the first user;
    recording in an event database, a voicemail communication from the first user communicated via the phone call;
    recording a first time stamp record in the event database comprising a time the voicemail communication was recorded and a length of the voicemail communication;
    confirming an identity of a second user based on a security identification provided by the second user;
    allowing the second user to access the system based upon the confirmation of the identity of the second user;
    delivering the voicemail communication to the second user;
    recording a second time stamp in the event database comprising a time the voicemail communication was delivered to the second user;
    restricting access to the event database such that none of the voicemail communication, the first time stamp record, and the second time stamp record can be modified or deleted, thereby providing an unalterable record of the voicemail communication, the first time stamp record, and the second time stamp record;
    only after the voicemail communication has been accessed by the second user, notifying the first user that the voicemail communication was accessed by the second user;
    assigning an initial first status of the voicemail communication for the first user and an initial second status of the voicemail communication for the second user, a "status" of a voicemail communication being a label associated with the voicemail communication for a particular user, and allowing modification of the first status by only the first user, and allowing modification of the second status by only the second user;

confirming an identity of an administrator based on a security identification provided by the administrator, the administrator being a third-party agreed upon by the first user and the second user;

allowing the administrator to access the system based upon the confirmation of the identity of the administrator;

receiving a request from the administrator for a report comprising the voicemail communication, the first time stamp, and the second time stamp; and providing the report to the administrator.

14. The method of claim 13, wherein the security identification of the first user comprises a biometric.

15. The method of claim 13, wherein the security identification of the second user comprises a biometric.

16. The method of claim 15, wherein the security identification of the first user comprises a biometric.

17. A voicemail communication logging system for logging a voicemail communication from a first user to a second user, comprising a computer having one or more processors executing instructions to implement software modules, the system comprising:

a storage device having a user database having stored therein a security identification of a first user and a security identification of a second user;

an event database configured to store voicemail communications, time stamp records associated with the voicemail communications, and status information associated with the voicemail communications;

a message recording module configured to: a) receive a phone call from the first user; b) record a voicemail communication from the first user by requiring the first user to access the system using the security identification of the first user; c) electronically receive the voicemail communication from the first user via a communication protocol; d) associate the voicemail communication as having been created by the first user based on the security identification of the first user; and e) store the voicemail communication in the event database;

a message checking module configured to: a) enable the second user to access the voicemail communication by requiring the second user to access the system using the security identification of the second user; b) access the voicemail communication stored in the event database; and c) electronically transmit the voicemail communication to the second user;

a time-stamp module configured to: a) generate a first time stamp record comprising a time the voicemail communication was recorded by the first user and a length of the voicemail communication, by identifying the time the voicemail communication was received from the first user and determining the length of the voicemail communication; b) generate a second time stamp record comprising a time the voicemail communication was accessed by the second user, by identifying a time the voicemail communication was accessed by the second user; c) store the first time stamp record in the event database; and d) store the second time stamp record in the event database;

a user control module configured to: a) control a status of the voicemail communication by enabling the first user to change a first status of the communication and storing the first status from a perspective of the first user in the event database until subsequently changed by the first user, a "status" of a voicemail communication being a label associated with the voicemail communication for a particular user; b) control the status of the voicemail communication by enabling the second user to change a second status of the voicemail communication and storing the second status from a perspective of the second user in the event database until subsequently changed by the second user, wherein changing the status of the voicemail communication does not alter any of the voicemail communication, the first time stamp record or the second time stamp record; and a master control module configured to: a) prevent modification or deletion of any of the voicemail communication, the first time stamp record, and the second time stamp record in the event database, such that the event database provides an unalterable record of each of the voicemail communication, the first time stamp record, and the second time stamp record; b) produce a report of selected contents of the event database including the voicemail communication, the first time stamp, and the second time stamp; and (c) provide administrator secured access to obtain a report by: confirming an identity of an administrator based on a security identification provided by the administrator, the administrator being a third-party agreed upon by the first user and the second user, allowing the administrator to access the system based upon the confirmation of the identity of the administrator, receiving a request from the administrator for a report comprising the voicemail communication, the first time stamp, and the second time stamp; and providing the report to the administrator;

wherein the security identification of the first user comprises a biometric.

18. The voicemail communication logging system of claim 17, herein the security identification of the second user comprises a biometric.

19. The voicemail communication logging system of claim 17, wherein the message checking module is further configured to notify the first user when the second user accesses the voicemail communication.

* * * * *